(12) United States Patent
Isogai (10) Patent No.: US 7,724,917 B2
(45) Date of Patent: May 25, 2010

(54) APPARATUS, METHOD, AND PROGRAM PRODUCT FOR DETECTING DIGITAL WATERMARK

(75) Inventor: Taichi Isogai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 930 days.

(21) Appl. No.: 11/465,488

(22) Filed: Aug. 18, 2006

(65) Prior Publication Data

US 2007/0172095 A1     Jul. 26, 2007

(30) Foreign Application Priority Data

Jan. 20, 2006    (JP)   ............................ 2006-012814

(51) Int. Cl.
*G06K 9/00*     (2006.01)
(52) U.S. Cl. ...................................... 382/100
(58) Field of Classification Search ................... 382/100
See application file for complete search history.

(56) References Cited

U.S. PATENT DOCUMENTS

| | | | | |
|---|---|---|---|---|
| 6,996,717 | B2 * | 2/2006 | Yin et al. | 713/176 |
| 7,343,025 | B2 * | 3/2008 | Seo et al. | 382/100 |
| 7,376,241 | B2 * | 5/2008 | Zhou et al. | 382/100 |
| 7,526,733 | B1 * | 4/2009 | Samson | 715/805 |
| 2005/0105763 | A1 * | 5/2005 | Lee et al. | 382/100 |
| 2005/0180594 | A1 | 8/2005 | Isogai | |

FOREIGN PATENT DOCUMENTS

| | | |
|---|---|---|
| JP | 3431593 | 5/2002 |
| JP | 2004-214906 | 7/2004 |

OTHER PUBLICATIONS

Chinese Office Action dated Jun. 20, 2008 corresponding to U.S. Appl. No. 11/465,488, filed Aug. 18, 2006.
Decision of a Patent Grant for 2006-012814 mailed on Sep. 29, 2009.

* cited by examiner

*Primary Examiner*—Matthew C Bella
*Assistant Examiner*—Dennis Rosario
(74) *Attorney, Agent, or Firm*—Turocy & Watson, LLP (57) ABSTRACT

A digital watermark detection apparatus detects a watermark value from a motion image in which a topological invariant is embedded as the watermark value. The digital watermark detection apparatus includes a watermark component extracting unit which extracts each watermark component from the motion image; an average value computing unit which computes an average value of component values of pixels included in the watermark component; an identified watermark component determination unit which determines whether or not the watermark component is an identified watermark component to be utilized in identifying an arrangement unit of a plurality of watermark components based on the average value; a watermark component identifying unit which identifies the watermark component except for the identified watermark component; and a watermark value computing unit which computes the watermark value based on the identified watermark component and the watermark components except for the identified watermark component.

21 Claims, 9 Drawing Sheets

|  | R G B | D |
|---|---|---|
| FRAME 1 | X Y Z | 4 |
| FRAME 2 | X Y Z | 4 |
| FRAME 3 | X Y Z | 4 |
| FRAME 4 | Z X Y | 1 |
| FRAME 5 | Z X Y | 1 |
| FRAME 6 | Z X Y | 1 |
| FRAME 7 | Y Z Y | 2 |
| ⋮ | ⋮ | ⋮ |

FIG.10

APPARATUS, METHOD, AND PROGRAM PRODUCT FOR DETECTING DIGITAL WATERMARK

CROSS-REFERENCE TO RELATED APPLICATIONS

This application is based upon and claims the benefit of priority from the prior Japanese Patent Application No. 2006-12814, filed on Jan. 20, 2006; the entire contents of which are incorporated herein by reference.

BACKGROUND OF THE INVENTION

1. Field of the Invention

The present invention relates to an apparatus, a method, and a program product for detecting a digital watermark, in which the watermark value is detected from a motion image in which a topological invariant is embedded as the watermark value.

2. Description of the Related Art

Conventionally, there is well known a digital watermark technique. In the digital watermark, pieces of information such as information on an author of copyright to data, user identification information, rights information, utilization condition, necessary confidential information in use, and copy control information are embedded in digital copyrighted work data such as sound, music, video, and an image while the pieces of information are hardly perceived, and the pieces of information embedded in the digital copyrighted work data are detected and utilized if needed. The digital watermark is utilized for the purpose of copyright protection or secondary use of the digital copyrighted work.

It is thought that the digital watermark is associated with a topological invariant by regarding geometric distortion as homomorphic mapping. The inventors already proposed a topological invariant digital watermarking technique in order to realize robustness to geometric distortion (for example, Japanese Patent No. 3431593). In the topological invariant digital watermark technique, an invariable topological invariant (for example, homotopy class) is embedded as the digital watermark under the geometric distortion.

Generally, security measures against a process performed in a time axis direction (hereinafter such processes are referred to as "time axis direction attack") such as frame rate conversion and frame thin-out can be realized by embedding the same watermark value in plural frames. However, in this case, it is difficult to distinguish the embedded watermark values whether the watermark values are embedded as the same watermark value or different watermark value. Therefore, it is necessary to detect switching of the watermark values.

In a technique in which a homotopy class is used as the topological invariant, one digital watermark value is realized by embedding and extracting three kinds of components of (X,Y,Z). In a technique of embedding one component in one frame or a technique of utilizing an inter-frame difference to embed one component, when the digital watermark suffers from the time axis direction attack, there is generated a problem that distinction cannot be made among the X, Y, and Z components, and thereby the watermark value cannot correctly be detected.

SUMMARY OF THE INVENTION

According to one aspect of the present invention, a digital watermark detection apparatus, which detects a watermark value from a motion image in which a topological invariant is embedded as the watermark value, the apparatus includes a watermark component extracting unit which extracts each watermark component from the motion image in which the watermark value is embedded, where the watermark value includes a plurality of different watermark components arranged according to a predetermined arrangement regularity; an average value computing unit which computes an average value of component values of each pixel included in the watermark component; an identified watermark component determination unit which determines, based on the average value, whether or not the watermark component is an identified watermark component which is to be utilized in identifying an arrangement unit of a plurality of watermark components included in the same watermark value within the plurality of watermark components included in the watermark value; a watermark component identifying unit which identifies the watermark components except for the identified watermark component based on the identified watermark component and the arrangement regularity; and a watermark value computing unit which computes the watermark value based on the identified watermark component and the watermark components except for the identified watermark component.

According to another aspect of the present invention, a method of detecting a digital watermark, which detects a watermark value from a motion image in which a topological invariant is embedded as the watermark value, the method includes extracting each watermark component from the motion image in which the watermark value is embedded, where the watermark value includes a plurality of different watermark components arranged according to a predetermined arrangement regularity; computing an average value of component values of each pixel included in the extracted watermark component; determining, based on the average value, whether or not the watermark component is an identified watermark component which is to be utilized in identifying an arrangement unit of a plurality of watermark components included in the same watermark value within the plurality of watermark components included in the watermark value; identifying the watermark component except for the identified watermark component based on the identified watermark component and the arrangement regularity; and computing the watermark value based on the determined identified watermark component and the watermark components except for the identified watermark component.

A computer program product according to still another aspect of the present invention causes a computer to perform the method according to the present invention.

DETAILED DESCRIPTION OF THE INVENTION

Preferred embodiments of a digital watermark detection apparatus, a digital watermark detection method, and a digital watermark detection program product according to the present invention will be described in detail with reference to the accompanying drawings. The invention shall not be limited to the following embodiments.

First Embodiment

Figure 1:
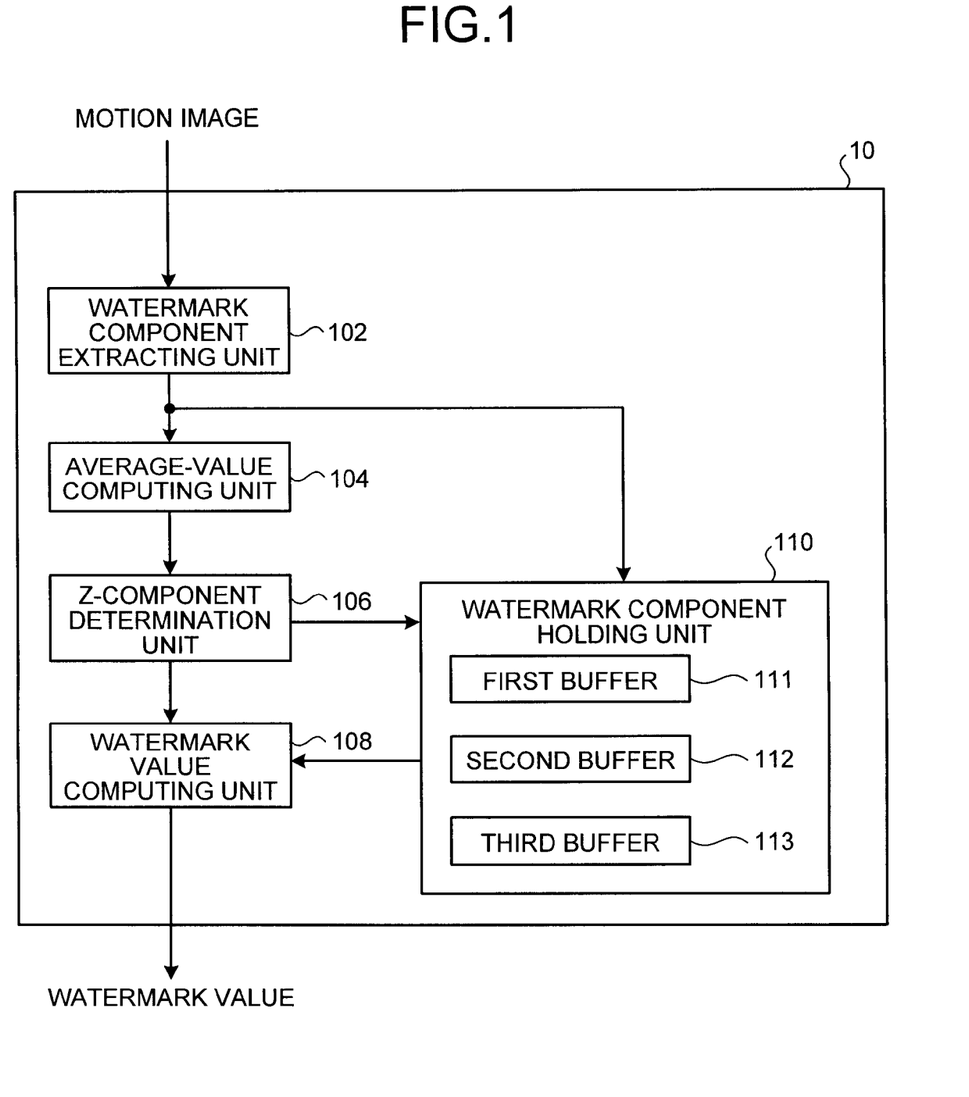
FIG. 1 is a block diagram showing a functional configuration of a digital watermark detection apparatus according to a first embodiment of the invention.

FIG. 1 is a block diagram showing a functional configuration of a digital watermark detection apparatus according to a first embodiment of the invention. The digital watermark detection apparatus 10 detects the watermark value embedded by the topological invariant digital watermarking technique. In the topological invariant digital watermarking technique, an invariable topological invariant (for example, homotopy class) is embedded as the watermark value under the geometric distortion.

Specifically, in the digital watermark embedding technique in which the homotopy class is used, assuming that n is a watermark value, W is a width of an image, H is a height of the image, and a pixel located at an uppermost left is set at (x,y)=(0,0), θ, and φ are determined by Equation 1, Equation 2, and Equation 3, respectively.

$$\theta = 2\arctan\left(\sqrt{\begin{array}{c}\tan^2\{(\pi/2)\times(x/W-1/2)\}+\\ \tan^2\{(\pi/2)\times(y/H-1/2)\}\end{array}}\right)$$ [Equation 1]

$$\phi = \arccos\left(\frac{\tan\{(\pi/2)\times(x/W-1/2)\}}{\sqrt{\begin{array}{c}\tan^2\{(\pi/2)\times(x/W-1/2)\}+\\ \tan^2\{(\pi/2)\times(y/H-1/2)\}\end{array}}}\right)$$ [Equation 2]

$(y/H - 1/2 \geq 0)$ $$\phi = 2\pi - \arccos\left(\frac{\tan\{(\pi/2)\times(x/W-1/2)\}}{\sqrt{\begin{array}{c}\tan^2\{(\pi/2)\times(x/W-1/2)\}+\\ \tan^2\{(\pi/2)\times(y/H-1/2)\}\end{array}}}\right)$$ [Equation 3]

$(y/H - 1/2 < 0)$

Therefore, a function expressed by Equation 4, i.e., the function concerning the homotopy class is obtained. The function is embedded in the image.

$(X, Y, Z) = (\sin\theta \cos n\phi, \sin\theta \sin n\phi, \cos\theta)$ [Equation 4]

The digital watermark detection apparatus 10 divides the target image into H small-area blocks in a longitudinal direction and into W small-area blocks in a horizontal direction, and the digital watermark detection apparatus 10 extracts a vector which becomes the watermark component from each small area. The vector is expressed by Equation 5.

$\vec{f}(x,y) = (X_{xy}, Y_{xy}, Z_{xy})$ [Equation 5]

Then, a solid angle is computed from each small area by Equation 6.

$\vec{f}(x,y) \cdot (\Delta_x \vec{f}(x,y) \times \Delta_y \vec{f}(x,y))$ [Equation 6]

Where "x" indicates vector product and "." indicates scalar product. The terms in Equation 6 are expressed by Equation 7 and Equation 8.

$\Delta_x \vec{f}(x, y) = \vec{f}(x+1, y) - \vec{f}(x, y) \quad x \neq W - 1$ [Equation 7]

$= \vec{f}(0, y) - \vec{f}(W - 1, y) \quad x = W - 1$ $\Delta_y \vec{f}(x, y) = \vec{f}(x, y+1) - \vec{f}(z, y) \quad x \neq H - 1$ [Equation 8]

$= \vec{f}(x, 0) - \vec{f}(x, H - 1) \quad y = H - 1$

A summation is computed by Equation 9.

$\Sigma_H \Sigma_W \vec{f}(x,y) \cdot (\Delta_x \vec{f}(x,y) \times \Delta_y \vec{f}(x,y))$ [Equation 9]

Equation 10 computes what number of circumferences of a unit sphere corresponds to the summation. A watermark value D is obtained by rounding off the computed value to the nearest integer number.

$D = (1/4\pi)\Sigma_H \Sigma_W \vec{f}(x,y) \cdot (\Delta_x \vec{f}(x,y) \times \Delta_y \vec{f}(x,y))$ [Equation 10]

On the assumption of the computation of the watermark value D, it is necessary to identify which of the plural watermark components embedded in data belongs to an X component, a Y component, or a Z component. It is also necessary to identify whether or not the plural watermark components are included in the same watermark value.

The digital watermark detection apparatus 10 according to the first embodiment identifies each component from the image in which the X component, the Y component, and the Z component are embedded, and the digital watermark detection apparatus 10 further identifies the component included in the same watermark value to compute the watermark value D.

In order to compute the watermark value D, the digital watermark detection apparatus 10 includes a watermark component extracting unit 102, an average-value computing unit 104, a Z-component determination unit 106, a watermark value computing unit 108, and a watermark component holding unit 110.

The watermark component extracting unit 102 extracts each watermark component constituting the watermark value. For example, the watermark component extracting unit 102 extracts the watermark component from the image in which the watermark component is embedded in a part of a frequency domain after discrete cosine transformation.

The average-value computing unit 104 computes an average value of the watermark component extracted by the watermark component extracting unit 102. Here, the average value of the watermark component means an average value of elements (for example, brightness and a color gradation level) constituting the watermark component. The Z-component determination unit 106 determines whether or not the watermark component belongs to the Z component based on the average value computed by the average-value computing unit 104. In the topological invariant digital watermarking technique in which the homotopy class is used as the topological invariant, the average value of the Z component does not become "0" while the average values of the X component and the Y component substantially become "0". Accordingly, whether or not the watermark component is the Z component can be determined based on whether or not the average value is "0".

It is assumed that the X component, Y component, and the Z component are embedded in the motion image which is the target of the digital watermark detection apparatus 10 according to predetermined arrangement regularity. Accordingly, when the Z-component determination unit 106 identifies the Z component, the Z-component determination unit 106 identifies a predetermined watermark component as the X component based on a positional relationship between the Z component and the X component, which are specified from the arrangement regularity. Similarly, the Z-component determination unit 106 identifies a predetermined watermark component as the Y component based on the positional relationship between the Z component and the Y component, which are specified from the arrangement regularity. That is, the Z-component determination unit 106 according to the first embodiment corresponds to watermark component extracting means.

Figure 2:
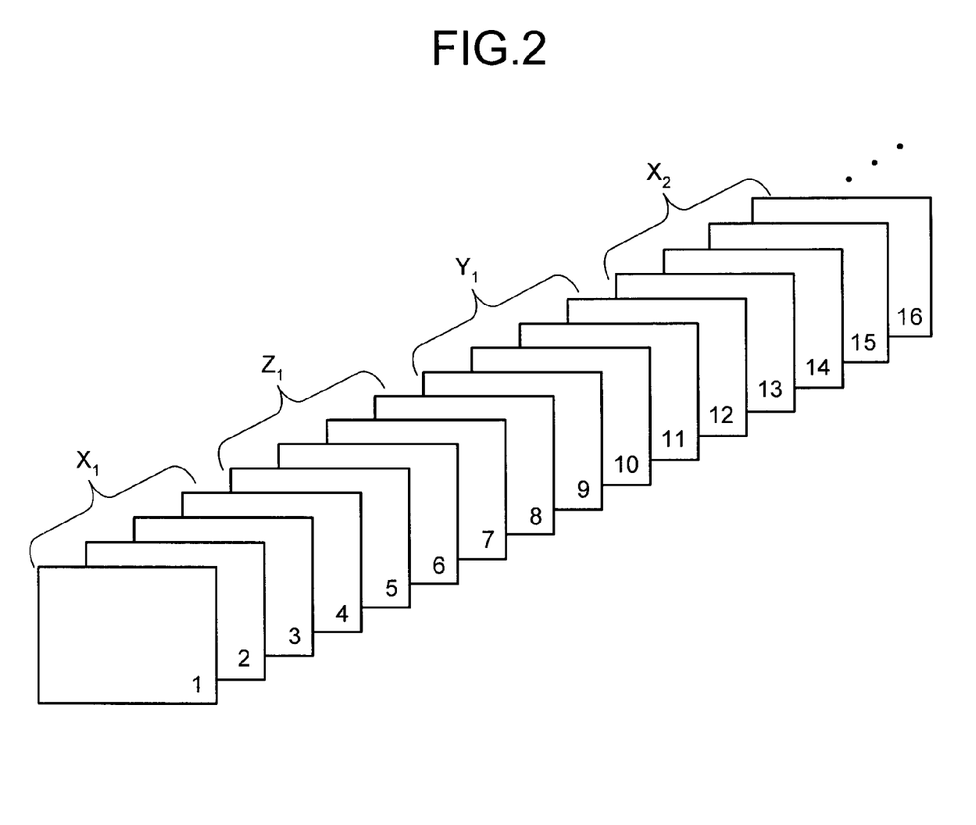
FIG. 2 is a view for explaining an embedded order of watermark components.

FIG. 2 is a view for explaining an embedded order of the watermark components. In FIG. 2, an X component "$X_1$", a Z component "$Z_1$", and a Y component "$Y_1$" are sequentially embedded. Then, components "$X_2$", "$Z_2$", "$Y_2$", "$X_3$", "$Z_3$", "$Y_3$", . . . are embedded in order of XZY. The components "$X_1$", "$Y_1$", and "$Z_1$" constitute a watermark value "$D_1$". Similarly the components whose suffix numbers are equal to each other constitute one watermark value.

In consideration of image missing caused by image compression or image loss, each of four watermark components are continuously embedded like "$X_1X_1X_1X_1$".

In FIG. 2, the order of XZY is the arrangement regularity, and the components are embedded according to the arrangement regularity. Accordingly, when the Z component is identified, it is found that the X component is detected immediately after identifying the Z component. It is found that the X component is also detected two components before the Z component. Similarly it is found that the Y component is detected immediately before or two components after the Z component.

The watermark component holding unit 110 holds the watermark component extracted by the watermark component extracting unit 102. When the Z-component determination unit 106 determines that a given watermark component is the Z component, the watermark component holding unit 110 holds the watermark component as the Z component. Similarly, the watermark component holding unit 110 holds the X component and the Y component. The watermark component holding unit 110 includes a first buffer 111, a second buffer 112, and a third buffer 113, and the buffers 111, 112, and 113 hold the watermark components respectively.

The watermark value computing unit 108 computes the watermark value D including the watermark components based on the X component, the Y component, and the Z component which are held by the watermark component holding unit 110.

Figure 3:
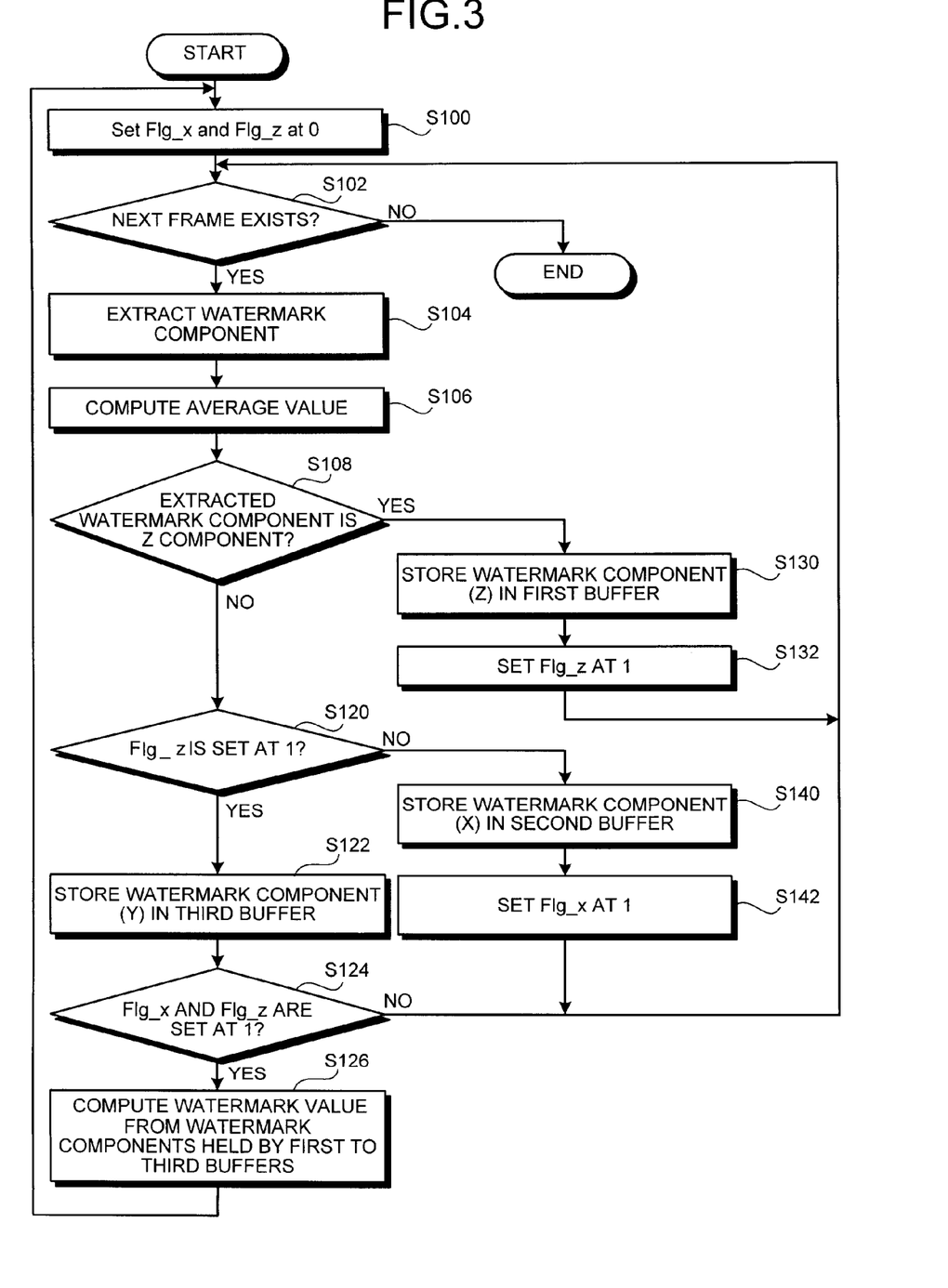
FIG. 3 is a flowchart showing a digital watermark detection process performed by the digital watermark detection apparatus.

FIG. 3 is a flowchart showing a digital watermark detection process performed by the digital watermark detection apparatus 10. The process shown in FIG. 3 corresponds to the case where the watermark components are embedded in order of "X", "Z", and "Y" as shown in FIG. 2.

First, Flg_x and Flg_z are set at 0 (Step S100). Flg_x and Flg_z are flags indicating whether or not the X component and the Z component are held by the watermark component holding unit 110, respectively. The watermark component holding unit 110 holds Flg_x and Flg_z.

Then, it is checked whether or not the next target frame exists in the motion image (Step S102). When the next target frame does not exist in the motion image (No in Step S102), the digital watermark detection process is ended. On the contrary, when the next target frame exists in the motion image (Yes in Step S102), the watermark component extracting unit 102 extracts the watermark component of the frame (Step S104). Then, the average-value computing unit 104 computes the average value of the watermark component (Step S106). The Z-component determination unit 106 determines whether or not the average value computed by the average-value computing unit 104 is 0, that is, whether or not the watermark component is the Z component (Step S108). When the watermark component is the Z component (Yes in Step S108), the watermark component, i.e., the Z component is stored in the first buffer 111 (Step S130). Then, Flg_z is set at 1 (Step S132).

On the other hand, when the watermark component is not the Z component (No in Step S108), and when the Flg_z is not 1 (No in Step S120), it is determined that the watermark component is the X component, and the watermark component is stored in the second buffer 112 (Step S140).

Through the process, sometimes the Y component is erroneously stored in the second buffer 112. However, in this case, the X component is stored (overwritten) in the second buffer 112 by a post-process before the watermark value is computed.

In Step S108, when the watermark component is not the Z component (No in Step S108), and when the Flg_z is 1 (Yes in Step S120), it is determined that the watermark component is the Y component, and the watermark component is stored in the third buffer 113 (Step S122). Further, when both Flg_x and Flg_z are 1 (Yes in Step S124), the watermark value computing unit 108 computes at this time the watermark value based on the watermark components which are stored in the first buffer 111, the second buffer 112, and the third buffer 113 (Step S126). The above Steps are repeated to the final frame to end the digital watermark detection process.

The Z component can be identified through the digital watermark detection process. Further, the X component and the Y component can be identified from the remaining two components according to the identified Z component and the arrangement regularity.

Sometimes the second and third watermark components are initially detected in the three watermark components constituting the watermark value. Even in this case, the watermark components constituting the same watermark value can be identified according to the arrangement regularity. Accordingly, the watermark value can correctly be detected.

Specifically, when the second watermark component is initially detected in one watermark value, the watermark value is computed from the three watermark components included in the watermark value next to the watermark value in which the second watermark component is included. Accordingly, it can be prevented that the wrong watermark value is computed from the watermark components included in the different watermark value.

Figure 4:
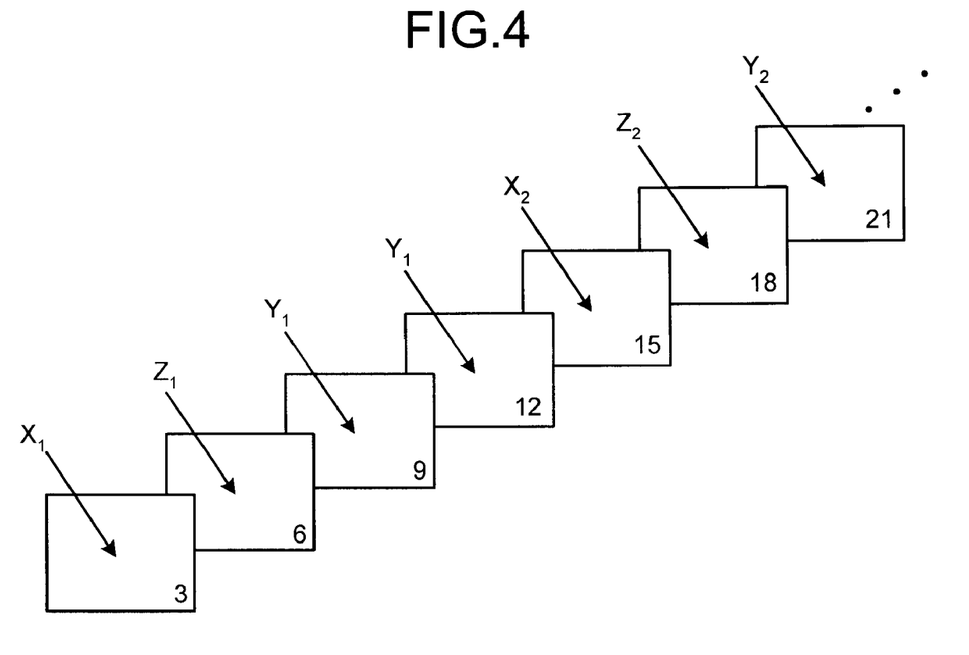
FIG. 4 schematically shows a motion image in which the number of frames is thinned out to one-thirds.

The digital watermark detection process will be described more specifically with reference to FIG. 4. FIG. 4 schematically shows the motion image in which the number of frames is thinned out to one-thirds while only the frames arranged in order of multiples of 3 are left, in the motion image in which the watermark components are embedded in the order described with reference to FIG. 3. After the number of frames is thinned out, the watermark components are arranged in order of $X_1, Z_1, Y_1, Y_1$, and $X_2$. The watermark value detection process performed to the motion image shown in FIG. 4 will be described below.

First, Flg_x and Flg_z are set at 0. Because the watermark component $X_1$ is embedded in the initially target frame, it is determined that the extracted watermark component is not the Z component. Further, because Flg_z is set at 0, the extracted watermark component $X_1$ is stored in the second buffer 112. At this point, Flg_x is set at 1.

Then, the watermark component $Z_1$ is extracted from the next frame. Because the watermark component $Z_1$ is the Z component, the watermark component $Z_1$ is stored in the first buffer 111. At this point, Flg_z is set at 1.

Further, the watermark component $Y_1$ is extracted from the next frame. The watermark component $Y_1$ is not the Z component and Flg_z is set at 1, so that the watermark component $Y_1$ is stored in the third buffer 113.

At this point, because both Flg_x and Flg_z are set at 1, the watermark value $D_1$ is computed from the watermark component $Z_1$ held by the first buffer 111, the watermark component $X_1$ held by the second buffer 112, and the watermark component $Y_1$ held by the third buffer 113.

In FIG. 4, when the process is performed from the frame in which the watermark component $Y_1$ is embedded while both the frame in which the watermark component $X_1$ is embedded and the frame in which the watermark component $Z_1$ is embedded are lost, the computation can correctly be performed from the following watermark value.

In this case, the watermark component $Y_1$ in the ninth frame is stored in the second buffer 112 and Flg_x is set at 1. Then, the watermark component $Y_1$ in the twelfth frame is stored in the second buffer 112. Then, the watermark component $X_2$ is stored in the second buffer 112. That is, the watermark component $Y_1$ is overwritten by the watermark component $X_2$ in the second buffer 112.

Then, the watermark component $Z_2$ is stored in the first buffer 111 and Flg_z is set at 1. Because the Flg_z is set at 1, the next extracted watermark component $Y_2$ is stored in the third buffer 113. At this point, because both Flg_x and Flg_z are set at 1, the watermark value $D_2$ is computed from the watermark component $Z_2$ held by the first buffer 111, the watermark component $X_2$ held by the second buffer 112, and the watermark component $Y_2$ held by the third buffer 113.

Thus, the three watermark components constituting the same watermark value can correctly be identified by the overwriting, even if the X component, the Z component, and the Y component constituting the one watermark value are detected in the middle of the combination.

Figure 5:
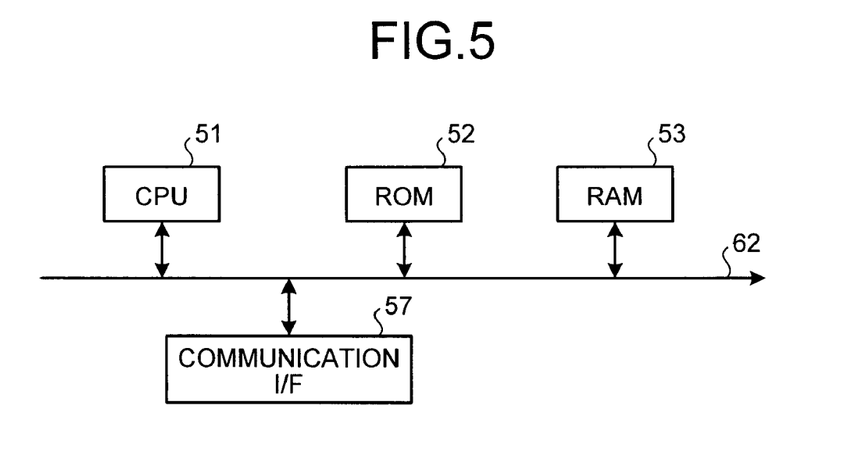
FIG. 5 shows a hardware configuration of the digital watermark detection apparatus of the first embodiment.

FIG. 5 shows a hardware configuration of the digital watermark detection apparatus 10 according to the first embodiment. In the hardware configuration, the digital watermark detection apparatus 10 includes ROM 52, CPU 51, RAM 53, a communication I/F 57, and a bus 62. The digital watermark detection program for executing the digital watermark detection process in the digital watermark detection apparatus 10 and the like are stored in ROM 52. CPU 51 controls each unit of the digital watermark detection apparatus 10 according to the programs stored in ROM 52. Various kinds of data necessary for the control of the digital watermark detection apparatus 10 are stored in RAM 53. The communication I/F 57 performs communication through a network. The bus 62 connects the units in the digital watermark detection apparatus 10.

The digital watermark detection program in the digital watermark detection apparatus 10 may be provided in the installable form or in the executable form while recorded in a recording medium such as CD-ROM, a Floppy (registered trademark) disk (FD), DVD which can be read by a computer.

In this case, in the digital watermark detection apparatus 10, the digital watermark detection program is read from the recording medium and executed, the digital watermark detection program is loaded on a main storage device, and the each unit explained in the software configuration is generated on the main storage device.

The digital watermark detection program according to the first embodiment may be configured such that digital watermark detection program is stored in the computer connected with the network such as the Internet and the digital watermark detection program is provided by downloading the digital watermark detection program through the network.

As mentioned above, the present invention is explained based on the first embodiment, however, various changes and modifications may be made in the first embodiment.

The arrangement regularity of the watermark components embedded in the motion image is not limited to the mode of the first embodiment. For example, the arrangement regularity having the arrangement units of "XXXX YYYY ZZZZ" may be adopted.

The digital watermark detection apparatus 10 may computes the watermark value from the motion image in which the plural watermark components are embedded in each of the plural areas of the one frame. In this case, the embedded area where the watermark components are embedded is already known, and the watermark component extracting unit 102 extracts the watermark component from each embedded area.

Second Embodiment

Figure 6:
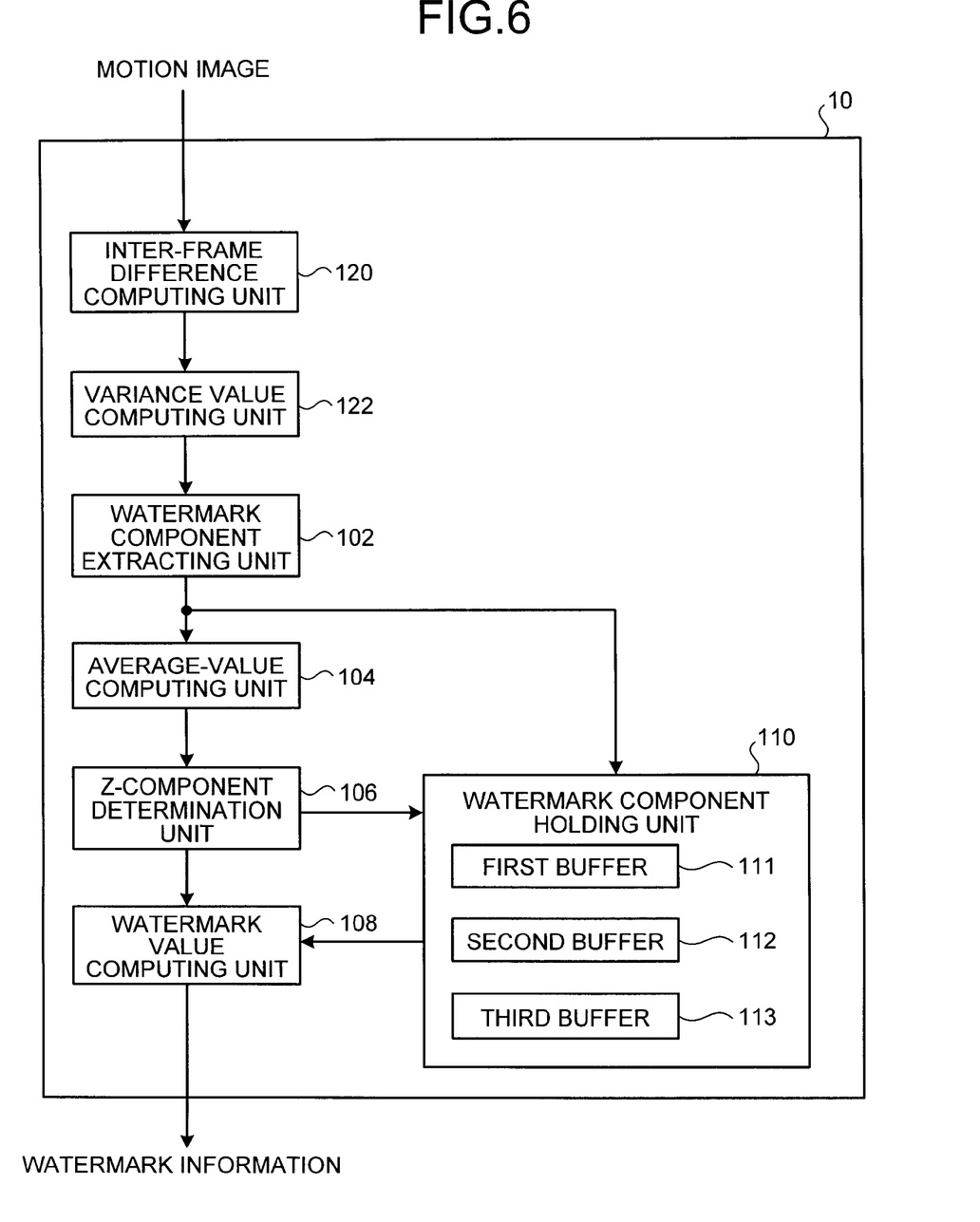
FIG. 6 is a block diagram showing a functional configuration of a digital watermark detection apparatus according to a second embodiment.

FIG. 6 is a block diagram showing a functional configuration of a digital watermark detection apparatus according to a second embodiment. The digital watermark detection apparatus 10 according to the second embodiment extracts the watermark component by utilizing an inter-frame difference. The digital watermark detection apparatus 10 includes an inter-frame difference computing unit 120 and a variance value computing unit 122, in addition to the functional configuration of the digital watermark detection apparatus 10 according to the first embodiment.

The inter-frame difference computing unit 120 computes a difference between the continuous two frames. The variance value computing unit 122 computes a variance value of the difference frame computed by the inter-frame difference computing unit 120. For example, when the watermark component is embedded in a brightness component of each image, the variance value computing unit 122 computes the variance value of the brightness. The variance value of the image in which the watermark component is embedded is larger than that of the image in which the watermark component is not embedded. Therefore, based on whether or not the variance value becomes not lower than a predetermined threshold, it can be determined whether or not the watermark component is embedded in the image. On the basis of the variance value, the average-value computing unit 104 computes the average value in the image in which the watermark component is embedded. That is, the average-value computing unit 104 according to the second embodiment corresponds to watermark-component existence determination means.

Figure 7:
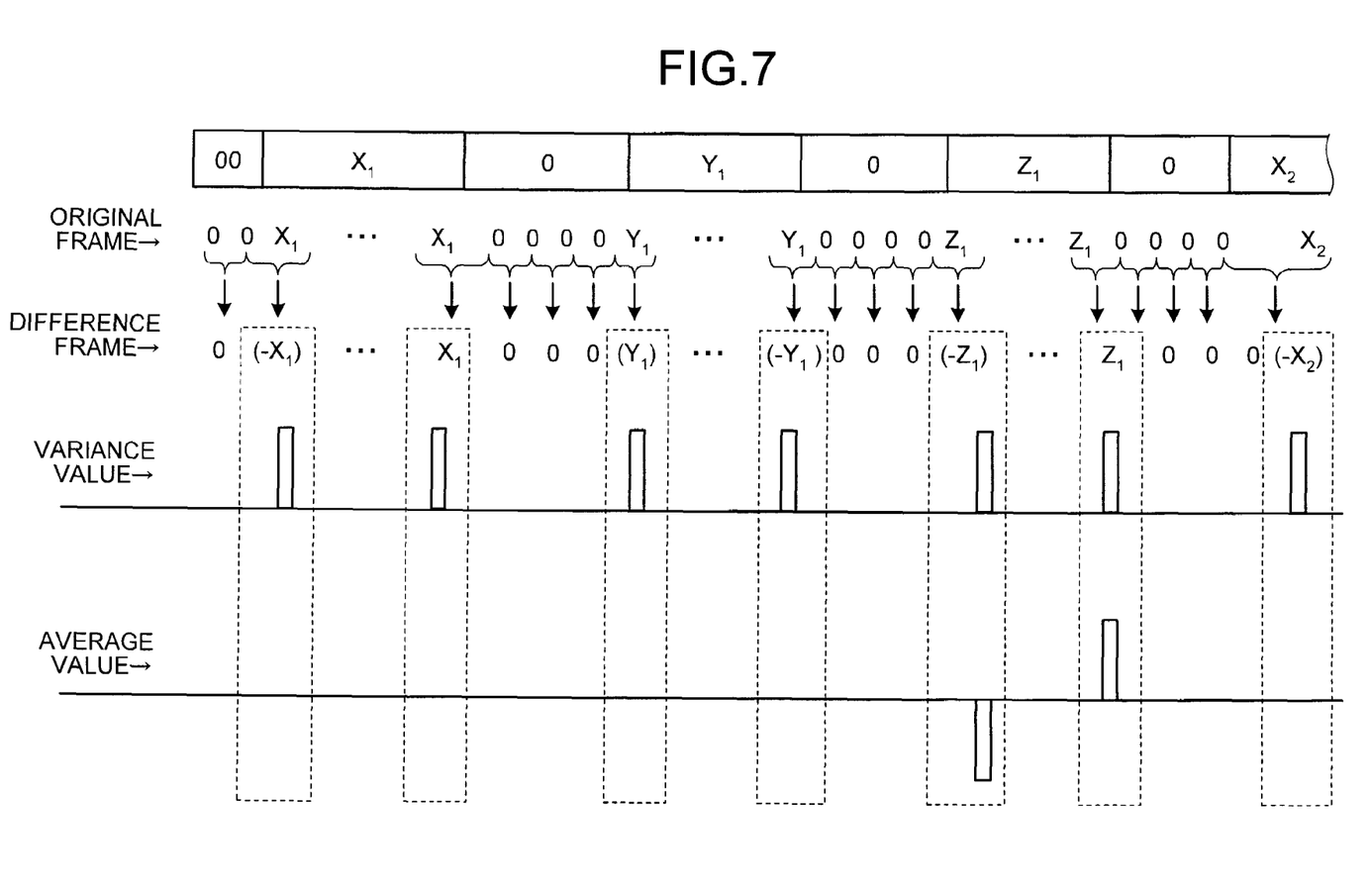
FIG. 7 is a view for explaining a difference frame.

FIG. 7 is a view for explaining the difference frame. For example, when the watermark components are continuously embedded like "XXXX", the difference frame becomes "000". At this point, "0" indicates that the watermark component cannot be extracted. Therefore, the watermark components are embedded in the frame in units of "0XX0" or "(−X)XX(−X)" in order to extract the watermark component from the difference frame.

For example, the difference frame of "$0(-X_1) \ldots X_1 000 (-Y_1) \ldots Y_1 000(-Z_1) \ldots Z_1 000(-X_2) \ldots$" is obtained from the frame having the arrangement of "$00X_1 X_1 \ldots X_1 0000Y_1 Y_1 \ldots Y_1 0000Z_1 Z_1 \ldots Z_1 0000X_2 X_2 \ldots$". That is, the watermark component can be extracted from the obtained difference frame.

In this case, the variance value of the difference frame including the watermark components such as ($-X_1$) and $X_1$ is larger than the variance values of other difference frames, so that it can be determined whether or not the watermark component exists. Further, the average value of ($-Z_1$) and $Z_1$ does not become 0 while the average value of ($-X_1$), $X_1$, ($-Y_1$) and $Y_1$ substantially becomes 0. An absolute value of the average value of ($-Z_1$) and $Z_1$ is a relatively large value. Accordingly, it can be determined whether or not the watermark component is the Z component. In FIG. 7, because the X component, the Y component, and the Z component are sequentially arranged, the X component and the Y component can be identified according to the arrangement.

Figure 8:
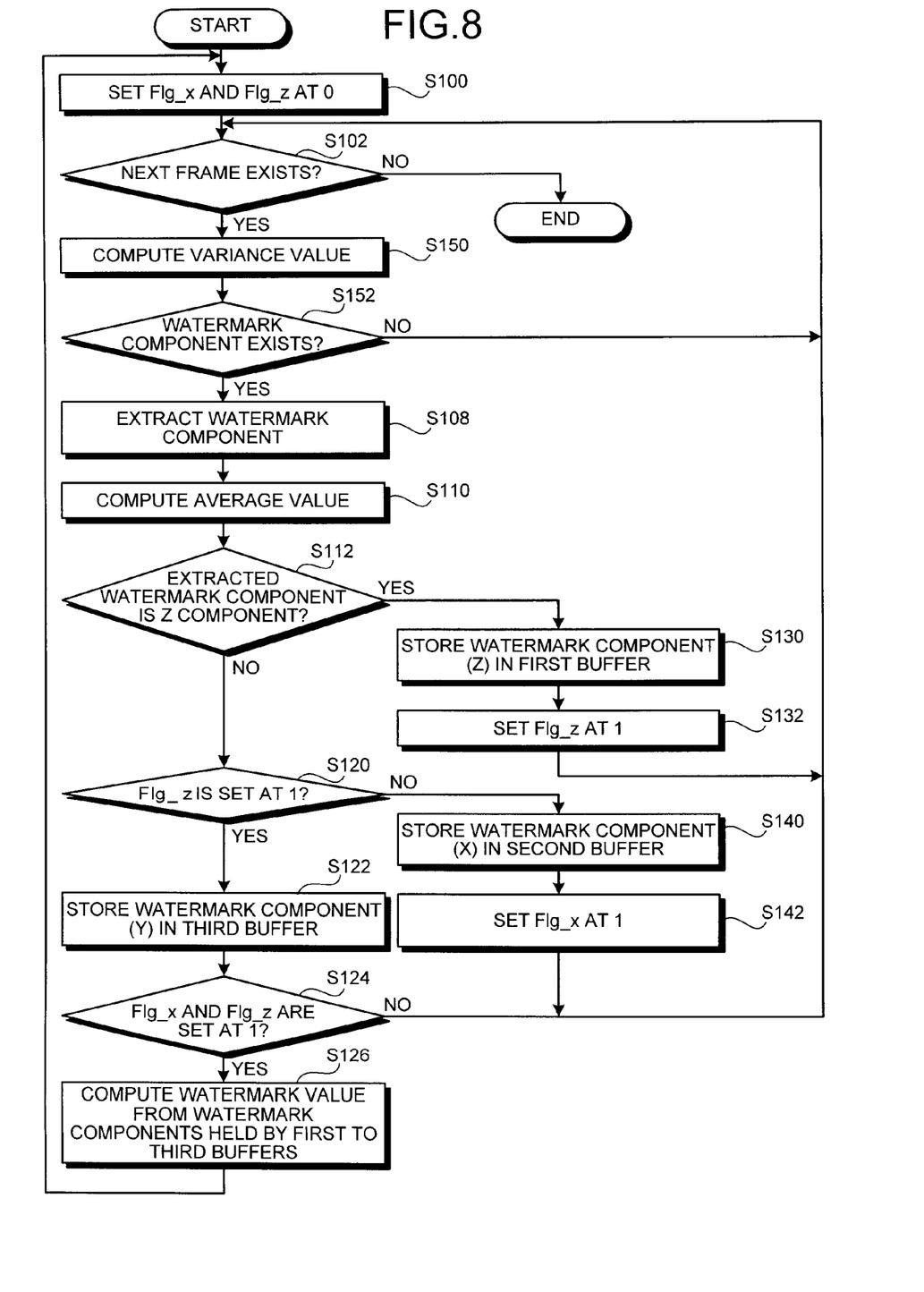
FIG. 8 is a flowchart showing a digital watermark detection process performed by the digital watermark detection apparatus of the second embodiment.

FIG. 8 is a flowchart showing a digital watermark detection process performed by the digital watermark detection apparatus 10 according to the second embodiment. In the digital watermark detection apparatus 10 according to the second embodiment, it is assumed that the difference frame is obtained by the inter-frame difference computing unit 120. When the next difference frame exists (Yes in Step S102), the variance value computing unit 122 computes the variance value (Step S150). When the variance value is not lower than the threshold, namely, when the watermark component is embedded in the frame (Yes in Step S152), the watermark component extracting unit 102 extracts the watermark component (Step S108). When the watermark component is not embedded (No in Step S152), the flow returns to Step S102, and the next difference frame is processed.

Thus, according to the digital watermark detection apparatus 10 according to the second embodiment, the existence of the watermark component is determined based on the variance value of the difference frame, and the watermark value can be computed based on the obtained watermark component.

In the digital watermark detection apparatus 10 according to the second embodiment, other configurations and processes are similar to those of the digital watermark detection apparatus 10 according to the first embodiment.

Third Embodiment

A digital watermark detection apparatus according to a third embodiment will be described below. The digital watermark detection apparatus 10 according to the third embodiment computes the watermark value from the motion image in which the three watermark component are embedded with respect to each of RGB in each frame.

Figure 9:
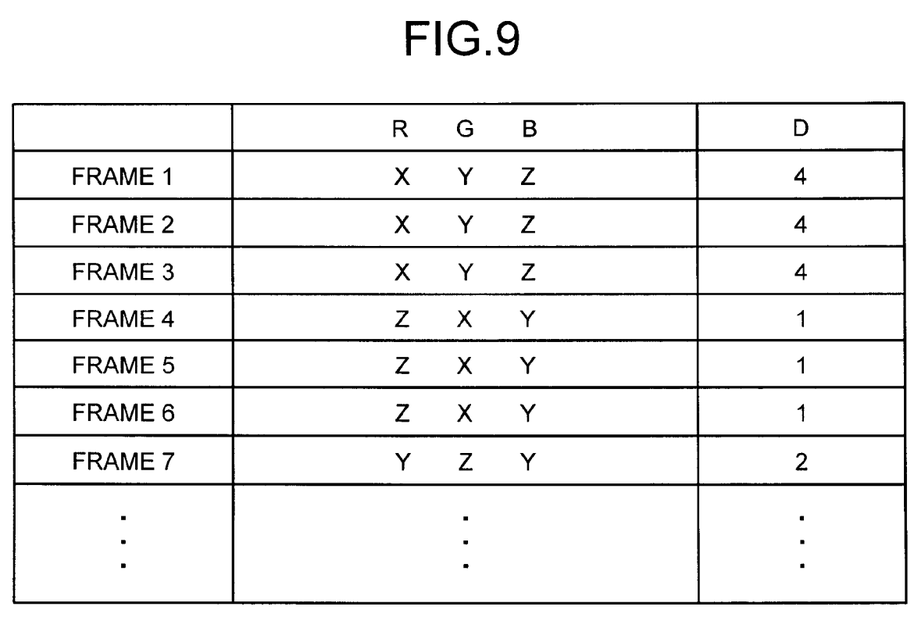
FIG. 9 is a view for explaining a motion image in which three watermark components are embedded in RGB.

FIG. 9 is a view for explaining the motion image in which the three watermark components are embedded in RGB. As shown in FIG. 9, in the frame 1, the X component, the Y component, and the Z component are embedded in RGB respectively. In consideration of thin-out of the frame, the same watermark value is embedded in the plural frames. In FIG. 9, the same watermark value is embedded in the three continuous frames. For example, in the frames 1 to 3, the watermark components are embedded such that the watermark value D becomes 4.

In the embodiment of the same watermark value, when the watermark values of "111222" are sequentially computed from the six frames, the digital watermark detection apparatus 10 hardly determines whether or not the watermark values in which the three watermark values of "12" are continuously embedded from the watermark values in which the six watermark values "1", "1", "1", "2", "2", and "2" are embedded. Therefore, as shown in FIG. 9, for the same watermark value, it is assumed that color spaces in which the Z components are embedded are set at the same color spase, and it is assumed that the color spaces in which the Z components are embedded are caused to differ from each other in switching the watermark value to different one. Accordingly, it can be determined whether or not the watermark value is the same watermark value based on the color space in which the Z component is embedded. The Z-component determination unit 106 corresponds to the switching determination means, which can determine whether or not the watermark value is switched.

Specifically, in FIG. 9, the same watermark value 4 is embedded in the frames 1 to 3. In each frame, the X component, the Y component, and the Z component are embedded in RGB respectively. Because the same watermark value is embedded in the three frames, the Z component is embedded in B of each frame.

In the frames 4 to 6, the Z component, the X component, and the Y component are sequentially embedded while each watermark component is shifted by one. In the frames 7 to 9 (not shown), the Y component, the Z component, and the X component are sequentially embedded while each watermark component is further shifted by one. That is, because the color in which the Z component is embedded is changed from B to R in the frame 4, it is found that the watermark value different from that of the frames 1 to 3 is embedded.

In the digital watermark detection apparatus 10 according to the third embodiment, it is assumed that the relationship among the colors in which the three watermark component are embedded respectively is held in changing the color in which the Z component is embedded. For example, in FIG. 9, the color in which the Z component is embedded is changed according to the arrangement regularity that the arrangements of the X component, the Y component, and the Z component are shifted by one space for the arrangements of RGB. Thus, the digital watermark detection apparatus 10 can identify the Z component by determining the arrangement relationship among the Z component, the X component, and the Y component, and the digital watermark detection apparatus 10 can identify the X component and Y component based on the Z component.

Figure 10:
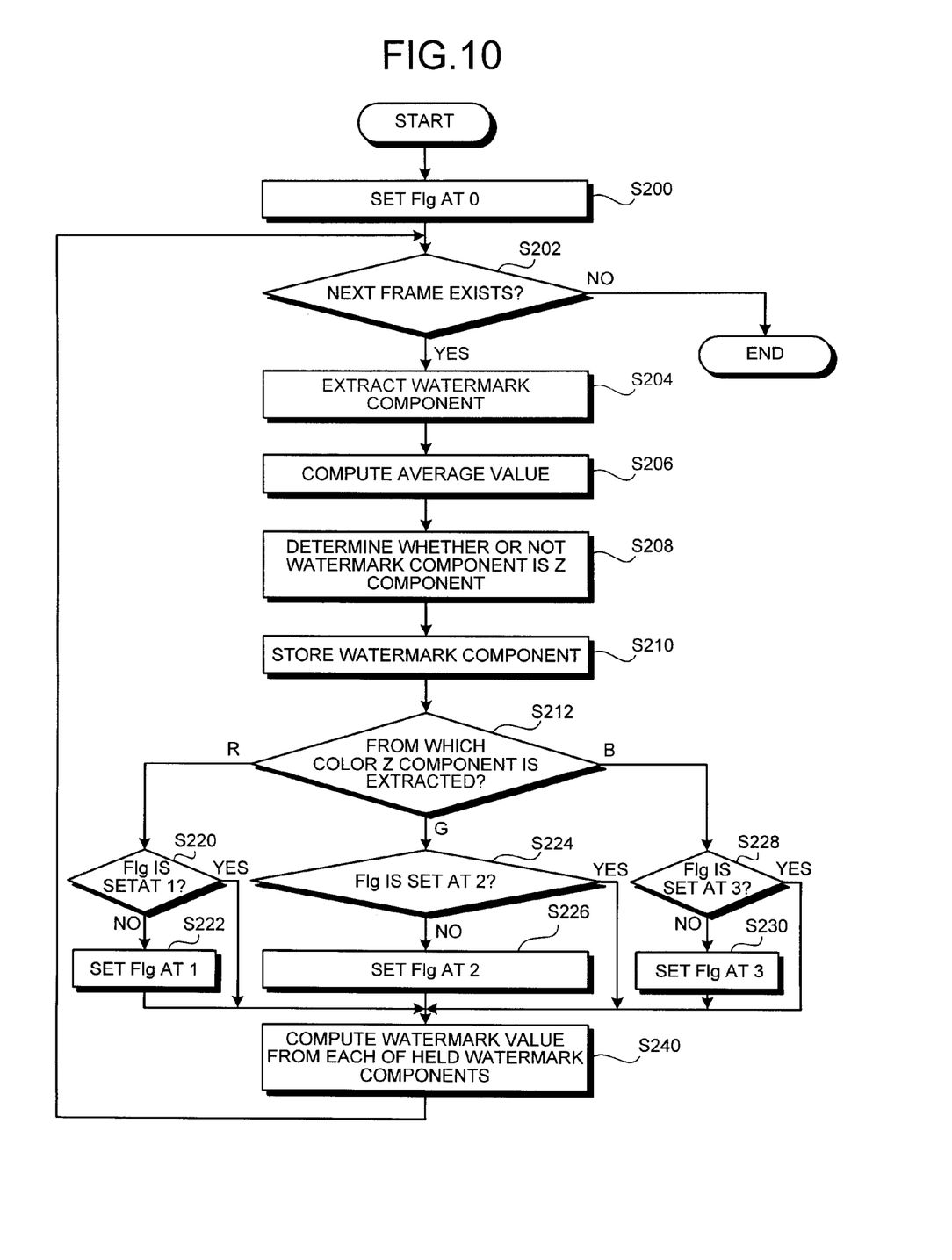
FIG. 10 is a flowchart showing a digital watermark detection process performed by a digital watermark detection apparatus of a third embodiment.

FIG. 10 is a flowchart showing a digital watermark detection process performed by the digital watermark detection apparatus 10 according to the third embodiment. First, Flg is set at 0 (Step S200). Then, it is determined whether or not the next frame exists in the motion image (Step S202). When the next frame does not exist in the motion image (No in Step S202), the digital watermark detection process is ended.

On the other hand, when the next frame exists in the motion image (Yes in Step S202), the watermark component extracting unit 102 extracts the watermark component from each of RGB in the frame (Step S204). Next, the average-value computing unit 104 computes the average value of the watermark component extracted from each color (Step S206). The Z-component determination unit 106 determines whether or not the average value computed by the average-value computing unit 104 is 0, namely, whether or not the watermark component is the Z component (Step S208). Then, the watermark components are stored in the watermark component holding unit 110 such that the color in which the Z component is detected can be recognized (Step S210).

When the Z component is extracted from R (R in Step S212), and when Flg is not set at 1 (No in Step S220), Flg is set at 1 (Step S222). Then, the watermark value computing unit 108 computes the watermark value from each watermark component held by the watermark component holding unit 110 (Step S240). At this point, as described above, the digital watermark detection apparatus 10 identifies the X component and Y component based on the Z component.

In Step S220, when Flg is set at 1 (Yes in Step S220), the flow goes to Step S240.

When the Z component is extracted from G (G in Step S212), and when Flg is not set at 2 (No in Step S224), Flg is set at 2 (Step S226), and the flow goes to Step S240. In Step S224, when Flg is set at 2 (Yes in Step S224), the flow goes to Step S240.

When the Z component is extracted from B (B in Step S212), and when Flg is not set at 3 (No in Step S228), Flg is set at 3 (Step S230), and the flow goes to Step S240. In Step S230, when Flg is set at 3 (Yes in Step S228), the flow goes to Step S240. When the watermark value is computed, the flow returns to Step S202, and the process is repeated to the final frame included in the motion image.

Thus, even if the watermark value is embedded in each color space of RGB, each watermark component included in the same watermark value can correctly be identified. When the same watermark value is continuously embedded, the Z component is embedded in the same color in the frame including the same watermark value. Accordingly, whether or not the watermark value is switched can be determined based on the color space in which the Z component is embedded.

In the digital watermark detection apparatus 10 according to the third embodiment, other configurations and processes are similar to those of the digital watermark detection apparatus 10 according to the above embodiments.

When the same watermark value is embedded in the plural frames, the watermark component holding unit 110 holds the each watermark component corresponding to each watermark value, and the watermark component holding unit 110 may compute the watermark value based on information which is obtained from the plural frames by outputting the average value of the plural watermark values as the watermark value.

As mentioned above, in the apparatus, method and program product for detecting a digital watermark according to the present invention, there is an advantage that the watermark value can correctly be detected even if the digital watermark suffers from an attack in the time axis direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark detection apparatus, which detects a watermark value from a motion image in which a topological invariant is embedded as the watermark value, the apparatus comprising:

a watermark component extracting unit which extracts each watermark component from the motion image in which the watermark value is embedded, where the watermark value includes a plurality of different watermark components arranged according to a predetermined arrangement regularity;

an average value computing unit which computes an average value of component values of each pixel included in the watermark component;

an identified watermark component determination unit which determines, based on the average value, whether or not the watermark component is a determined identified watermark component which is to be utilized in identifying an arrangement unit of a plurality of watermark components included in the same watermark value within the plurality of watermark components included in the watermark value;

a watermark component identifying unit which identifies each watermark component except for the determined identified watermark component based on the identified watermark component and the arrangement regularity, where the each watermark component is included in the watermark value; and a watermark value computing unit which computes a watermark value based on the determined identified watermark component and the watermark components identified by the watermark component identifying unit.

2. The digital watermark detection apparatus according to claim 1, wherein the watermark component extracting unit extracts the plurality of watermark components, and the identified watermark component determination unit determines that the watermark component having the average value different from that of the other watermark components is the identified watermark component.

3. The digital watermark detection apparatus according to claim 2, wherein the identified watermark component determination unit determines that the watermark component having the average value which becomes a value except for 0 is the identified watermark component.

4. The digital watermark detection apparatus according to claim 1, wherein the watermark value in which the topological invariant is set at a homotopy class is embedded in a frame included in the motion image, and the watermark value includes an X component, a Y component, and a Z component as the watermark components, and the identified watermark component determination unit determines the Z component as the identified watermark component.

5. The digital watermark detection apparatus according to claim 4, wherein a relationship between an area where the X component is embedded and an area where the Z component is embedded and a relationship between an area where the Y component is embedded and the area where the Z component is embedded are previously determined, and the watermark component identifying unit identifies the X component and the Y component based on the Z component determined as the identified watermark component, the relationship between the area where the X component is embedded and the area where the Z component is embedded, and the relationship between the area where the Y component is embedded and the area where the Z component is embedded.

6. The digital watermark detection apparatus according to claim 1, wherein the plurality of watermark components are embedded in each frame included in the motion image, and the watermark component extracting unit extracts the watermark components from each frame included in the motion image.

7. The digital watermark detection apparatus according to claim 1 further comprising:

a difference frame computing unit which computes a difference frame of each frame;

a variance value computing unit which computes a variance value of the component value of each pixel included in the difference frame; and a watermark component existence determination unit which determines whether or not the watermark component is embedded in the difference frame based on the variance value, wherein the watermark component extracting unit extracts the watermark component from the difference frame in which the watermark component is determined to be included.

8. The digital watermark detection apparatus according to claim 1, wherein the watermark component is embedded in each of a plurality of embedded areas in each frame included in the motion image, and the watermark component extracting unit extracts the watermark components from each of the embedded area.

9. The digital watermark detection apparatus according to claim 1, wherein the watermark components are embedded in each color space included in the motion image, the average value computing unit computes the average value of the color spaces as the average value of the component values of each pixel included in the watermark component, the identified watermark component determination unit determines any one of color spaces included in the motion image as the identified watermark component, and the watermark component extracting unit extracts the color space except for the identified watermark component in the motion image as the watermark component.

10. The digital watermark detection apparatus according to claim 9, wherein the same watermark value is embedded in the plurality of frames, the identified watermark component included in the watermark value is embedded in the same color space in the plurality of frames, and the digital watermark detection apparatus further comprises a switching determination unit which determines whether or not the watermark value is switched based on the color space determined as the identified watermark component by the identified watermark component determination unit.

11. A method of detecting a digital watermark, which detects a watermark value from a motion image in which a topological invariant is embedded as the watermark value, the method comprising:

extracting each watermark component from the motion image in which the watermark value is embedded, where the watermark value includes a plurality of different watermark components arranged according to a predetermined arrangement regularity;

computing an average value of component values of each pixel included in the extracted watermark component;

determining, based on the average value, whether or not the watermark component is a determined identified watermark component which is to be utilized in identifying an arrangement unit of a plurality of watermark components included in the same watermark value within the plurality of watermark components included in the watermark value;

identifying each watermark component except for the determined identified watermark component based on the determined identified watermark component and the arrangement regularity; and computing a watermark value based on the determined identified watermark component and the watermark component identified by the watermark component identifying unit.

12. The method of detecting a digital watermark according to claim 11, wherein the plurality of watermark components are extracted, and the watermark component having the average value different from that of the other watermark components is determined to be the identified watermark component.

13. The method of detecting a digital watermark according to claim 12, wherein the watermark component having the average value which becomes a value except for 0 is determined to be the identified watermark component.

14. The method of detecting a digital watermark according to claim 11, wherein the watermark value in which the topological invariant is set at a homotopy class is embedded in a frame included in the motion image, the watermark value includes an X component, a Y component, and a Z component as the watermark components, and the Z component is determined as the identified watermark component.

15. The method of detecting a digital watermark according to claim 14, wherein a relationship between an area where the X component is embedded and an area where the Z component is embedded, and a relationship between an area where the Y component is embedded and the area where the Z component is embedded are previously determined, and the X component and the Y component are identified based on the Z component determined as the identified watermark component and the relationships.

16. The method of detecting a digital watermark according to claim 11, wherein the plurality of watermark components are embedded in each frame included in the motion image, and the watermark components are extracted from each frame included in the motion image.

17. The method of detecting a digital watermark according to claim 11 further comprising:

computing a difference frame of each frame;

computing a variance value of the component value of each pixel included in the difference frame;

determining whether or not the watermark component is embedded in the difference frame based on the variance value; and extracting the watermark component from the difference frame in which the watermark component is determined to be included.

18. The method of detecting a digital watermark according to claim 11, wherein the watermark component is embedded in each of a plurality of embedded areas in each frame included in the motion image, and the watermark component is extracted from each of the embedded area.

19. The method of detecting a digital watermark according to claim 11, wherein the watermark components are embedded in each color space included in the motion image, the average value of the color spaces is computed as the average value of the component values of each pixel included in the watermark component, any one of color spaces included in the motion image is determined as the identified watermark component, and the color spaces except for the identified watermark component in the motion image are extracted as the watermark component.

20. The method of detecting a digital watermark according to claim 19, wherein the same watermark value is embedded in the plurality of frames, the identified watermark component included in the watermark value is embedded in the same color space in the plurality of frames, and a switching of the watermark value is determined based on the color space determined as the identified watermark component.

21. A computer program product having a computer readable medium including programmed instructions, which detects a watermark value from a motion image in which a topological invariant is embedded as the watermark value, wherein the instructions, when executed by a computer, cause the computer to perform:

extracting each watermark component from the motion image in which the watermark value is embedded, where the watermark value includes a plurality of different watermark components arranged according to a predetermined arrangement regularity;

computing an average value of component values of each pixel included in the extracted watermark component;

determining, based on the average value, whether or not the watermark component is a determined identified watermark component which is to be utilized in identifying an arrangement unit of a plurality of watermark components included in the same watermark value within the plurality of watermark components included in the watermark value;

identifying each watermark components except for the determined identified watermark component based on the determined identified watermark component and the arrangement regularity; and computing a watermark value based on the determined identified watermark component and the watermark component identified by the watermark component identifying unit.

* * * * *